Nov. 16, 1965     R. D. JOHNSON     3,217,885
AUTOMATIC WATER TREATMENT SYSTEM
Filed May 24, 1962                    2 Sheets-Sheet 1
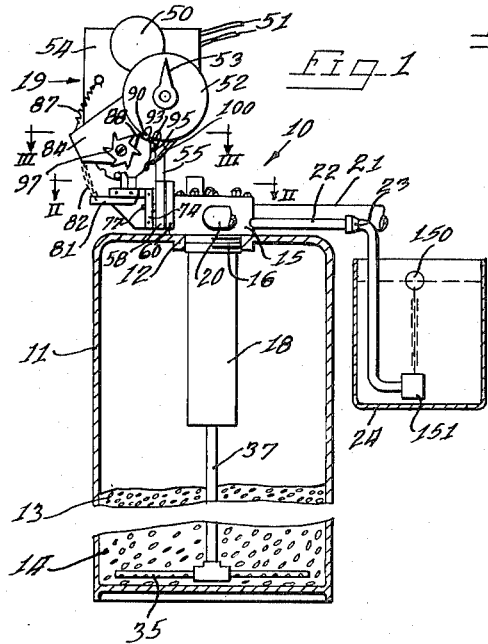
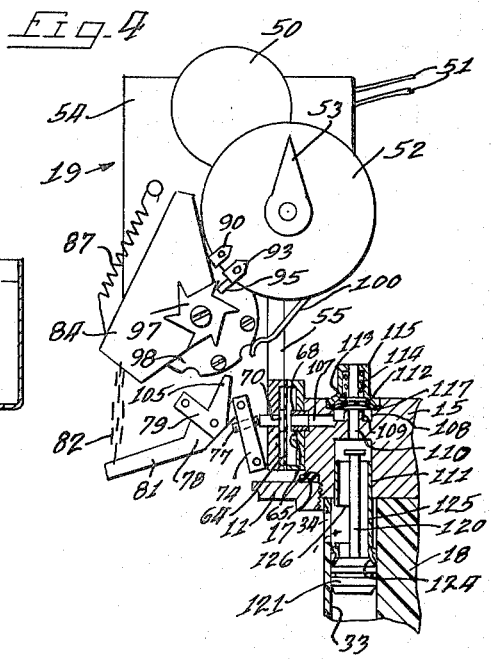
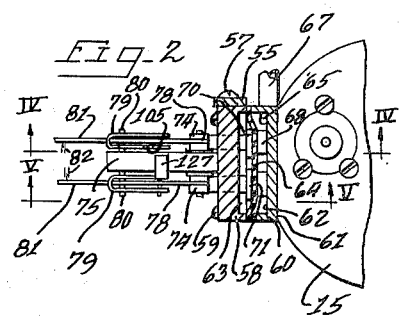
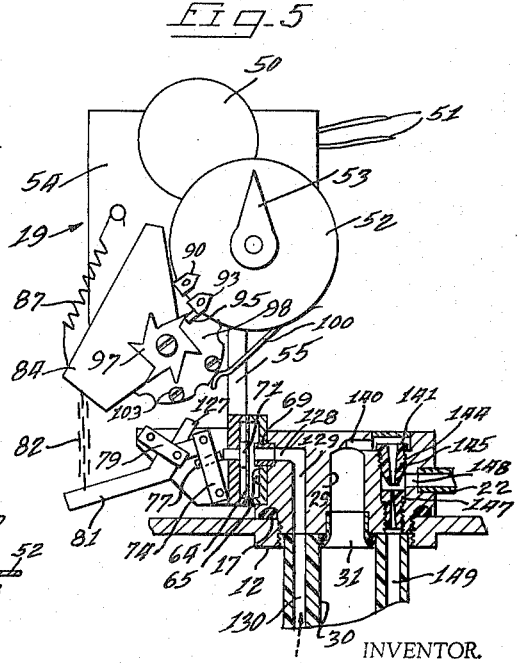
INVENTOR.
Richard D. Johnson
BY
Hill, Sherman, Meroni, Gross & Simpson
ATTORNEYS

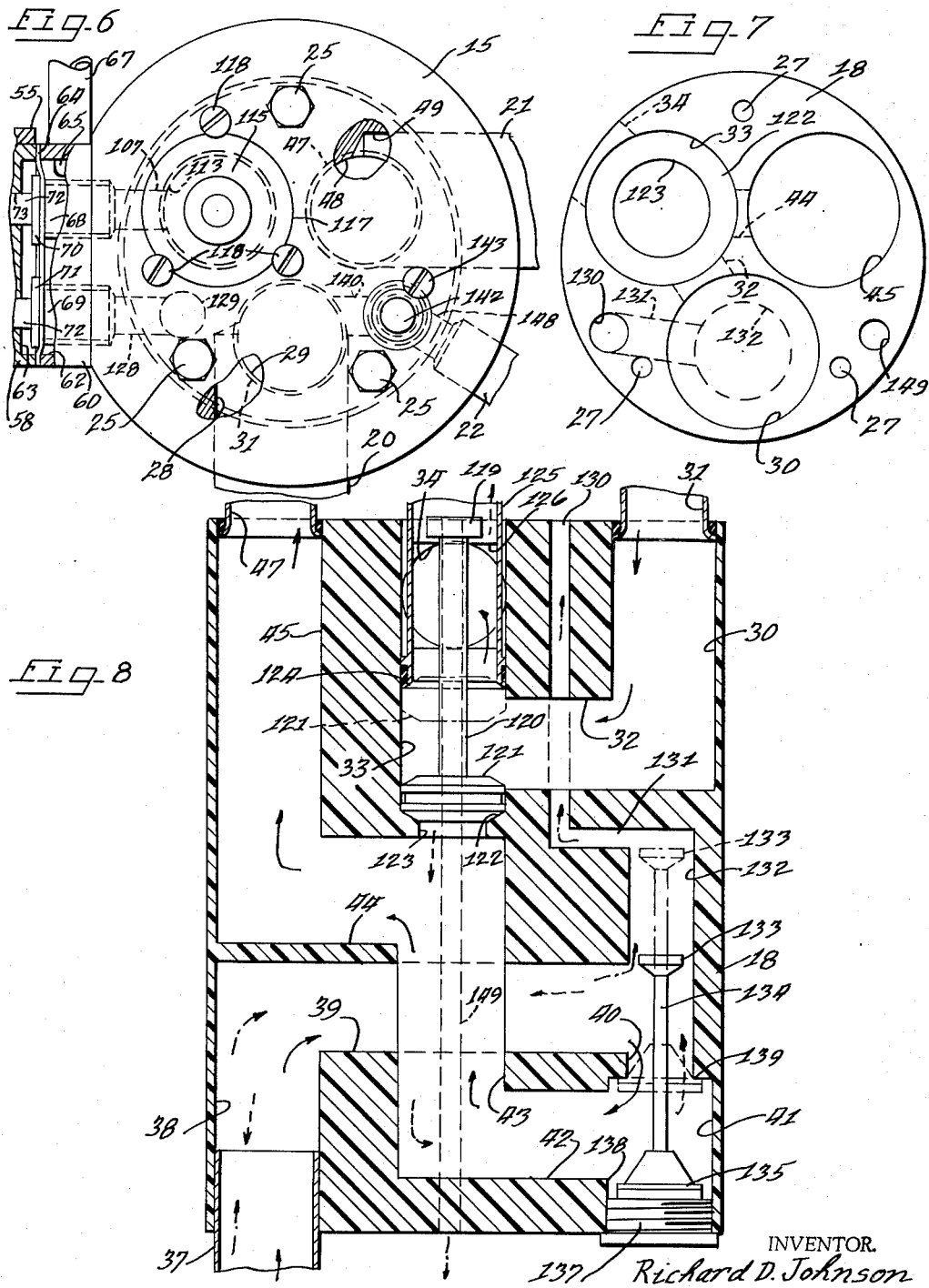

United States Patent Office 3,217,885
Patented Nov. 16, 1965

3,217,885
AUTOMATIC WATER TREATMENT SYSTEM
Richard D. Johnson, Des Plaines, Ill.
(220 W. St. Charles Road, Villa Park, Ill.)
Filed May 24, 1962, Ser. No. 197,527
9 Claims. (Cl. 210—134)

The present application is a continuation-in-part of my application Serial Number 855,163, filed November 24, 1959, now abandoned.

The present invention relates to improvements in water treating systems, and more particularly concerns novel apparatus especially useful in domestic water softeners.

Heretofore water treating apparatus especially useful for domestic water softeners has generally required extensive and sometimes complex arrays of valves and conduits externally of the main treatment tank, and often several pipe connections on the tank itself. In addition to being unsightly and space-consuming, the various plumbing and valving features of prior apparatus of this kind have generally been of such complexity and the various working parts of such inaccessibility as to render them difficult to service.

It is, accordingly, an important object of the present invention to provide new and improved water treatment apparatus, especially suitable for domestic water softener installations, which affords an unusually compact unit easily installed and involving the barest minimum of conduits or pipes externally of the unit.

Another object of the invention is to provide a new and improved flow control unit for water treating apparatus wherein a substantial portion of the unit is housed directly within the water tank.

A further object of the invention is to provide a new and improved water treatment control assembly constructed and arranged to be mounted directly upon the top of the treating tank and in substantial part within the tank.

Still another object of the invention is to provide a new and improved water treating apparatus including a flow control unit serving as a cap for a water treating tank.

Yet another object of the invention is to provide a new and improved fully automatic water treating system including a compact flow control unit and combined time control apparatus adapted to effect cyclically or selectively according to predetermined setting of all phases of a water treating system including service flow, backwash, regeneration and rinsing.

It is a still further object of the invention to provide unique means for selectively automatically backwashing a water softener with greater frequency than required for regeneration.

It is also an object of the invention to provide new and improved time control means for water treatment apparatus.

Other objects, features and advantages of the present invention will be readily apparent from the following detailed description of a preferred embodiment thereof taken in conjunction with the accompanying drawings, in which:

FIGURE 1 is an upright elevational and schematic view of a water treating apparatus embodying features of the invention;

FIGURE 2 is an enlarged fragmentary sectional elevational detail view taken substantially on the line II—II of FIGURE 1;

FIGURE 3 is a fragmentary enlarged sectional elevational detail view taken substantially on the line III—III of FIGURE 1;

FIGURE 4 is a vertical sectional elevational detail view on an enlarged scale taken substantially on the line IV—IV of FIGURE 2;

FIGURE 5 is an enlarged fragmentary vertical sectional elevational detail view taken substantially on the line V—V of FIGURE 2;

FIGURE 6 is an enlarged top plan view, with certain parts broken away and in section of the distributor cap member of the assembly;

FIGURE 7 is a top plan view of the flow control valve body of the assembly; and

FIGURE 8 is an illustrative vertical sectional developed view through the valve body.

According to the present invention a self-contained flow controlling unit 10 is provided in a water treating system of which a domestic water softener is depicted by way of illustration. For this purpose the unit 10 is constructed and arranged to be mounted on a water softener tank 11 of any suitable construction and size, made from metal or reinforced plastic such as fiber glass and provided on its top with an inlet opening flange 12. Within the tank 11 is a bed of water softening mineral 13 such as zeolite or an ion exchange mineral which may be underlain by a bed of coarse sand or gravel 14.

Desirably, the flow control unit 10 is constructed and arranged to be secured in assembly with the tank 11 by the simple expedient of attaching a distributor cap member 15 to the top of the tank within the access opening flange 12. For this purpose, the distributor cap member 15 comprises a metallic body member, such as brass, of a larger diameter than the opening through the flange 12 so as to seat on the margin of the top of the tank about the opening, with a central reduced diameter depending externally threaded attachment boss portion 16 on the cap member threadedly secured within the flange 12. As best seen in FIG. 4, a tight water sealed relation with the top of the tank 11 is maintained by a gasket 17 between the overlapping portions of the top of the tank 11 and the superposed marginal portion of the cap member 15.

Advantageously, the remaining components of the flow control apparatus unit 10 are attached to and carried by the cap member 15. Major sub-assemblies of the unit include a flow controlling valve body 18 adapted to be received entirely within the tank 11, and a timer assembly 19 mounted to project upwardly entirely outside of the tank 11. In addition, the body of the cap member 15 has preferably permanently secured thereto branch water pipe ducts or conduits including a raw water intake conduit 20, a treated water delivery conduit 21, and a regenerant or brine intake conduit 22. All of these conduits are preferably of relatively short lengths so as to facilitate handling of the unit 10 and assembly thereof with the tank 11. For the most part, of course, the flow controlling unit 10 and the tank 11 with its contents may be shop or factory assembled and delivered in that condition to the site of use where the conduits 20, 21 and 22 are coupled in known manner to, respectively, the available water supply pipe (not shown), a service line pipe or conduit (not shown) and through a suitable connecting conduit 23 with a brine tank 24. If preferred, of course, the brine tank 24 may be attached to the water tank 11, and in that case, of course, the connection afforded through the conduit 23 with the brine intake conduit 22 may be effected at the shop or factory.

In a compact highly practical form, the valve body 18 is constructed from a single block of rigid plastic material in which various bores and passages are drilled or molded. To this end, the valve body 18 is constructed of elongated externally cylindrical form and of a diameter to extend freely through the access opening afforded by the tank top flange 12 (FIGS. 1 and 7). At its upper end, the valve body is secured concentrically in abutment with the lower end of the attachment boss 14. Such attachment is preferably effected removably by means of suitable screws or bolts 25 (FIG. 6) extending downwardly through the distributor cap member 15 and received attachingly in threaded bores 27 in the upper end portion of the valve body (FIG. 7). As thus secured together, the distributor cap member 15 and the valve body 18 function as a flow controlling unit and are provided with complementary and joining flow controlling passages and ports.

Referring now to FIGURES 6, 7 and 8, during service operation of the system, raw water enters from the intake conduit 20 into a radial port 28 communicating with a longitudinally extending downwardly opening passage bore 29 registering coaxially with a longitudinal flow controlling bore 30 in the valve body 18, the cap member 15 carrying a tubular ring seal assembly 31 which extends across the parting faces or joint between the cap member 15 and the body 18. From the bore 30, the raw water passes through a lateral branch 32 within the valve body 18 into a longitudinal bore 33 in the valve body from which a port 34 opens through the perimeter of the valve body into the upper portion of the chamber within the tank 11. Thence the raw water circulates on service demand downwardly through the softening mineral bed 13 and thence through a lateral pipe screen 35 attached in communication with the lower end of a vertical draw-off pipe 37 (FIG. 1) having its upper end portion secured within the downwardly opening end of a longitudinal blind end bore 38 in the valve body 18. From the bore 38 the treated water passes through a branch bore or duct 39 to a port 40 leading into a short longitudinal bore 41 in the lower end portion of the body 18 aligned with the intake bore 30. Thence, the treated water passes by way of a lateral passage or bore 42 into a longitudinally extending lower end extension 43 of the bore 33 in the upper end portion of the valve body. Continuing its flow, the treated water leaves the bore portion 43 through a lateral passage or port 44 and enters the lower end portion of an upwardly opening blind end service delivery bore 45 in the upper end portion of the valve body 18 communicating through a sealing ring assembly 47 with a vertical blind end bore 48 coaxially aligned in the cap member 15 and from which leads a service port 49 into which the service delivery conduit branch 21 is connected. For convenience in visualizing the service flow pattern, solid directional flow arrows have been applied in FIGURE 8.

As is customary, the service condition of the system continues for a substantial interval of time as may be predetermined until backwashing to purge the mineral bed 13 of iron and other foreign solids, and regeneration of the mineral bed 13 are undertaken. By the present invention, predetermined cyclical backwashing and regeneration are effected automatically by the timer 19. This timer includes an electric clock mechanism having an electrical motor 50 arranged to be connected in an electrical power line in any preferred manner through electrical leads 51. The clock works, it will be understood, may comprise any preferred arrangement of gearing operatively coupled to the motor 50 to drive a time dial 52 rotatably clockwise relative to a stationarily mounted reference pointer 53. In a desirable arrangement, the dial 52 is driven one full revolution every twenty-four hours, although by suitable modifications in gearing it may be caused to revolve at a different speed. Appropriate time reference legends on the face of the dial 52 afford visual aid in setting the dial in relation to the reference indicator pointer 53, and the dial is suitably adapted to be adjusted manually relative to the pointer 53 to establish desirable timing of the backwash and regeneration cycles under the control of the timer.

Mounting of the time clock mechanism inclusive of the motor 50 and the rotary timer dial on the distributor head cap member 15 is effected through a suitable mounting bracket including a bracket plate 54 supported in a vertical plane by a vertical bracket arm 55 removably attached as by means of screws 57 (FIG. 2) to one side of a poppet valve housing plate member 55 detachably secured as by means of screws 59 to a companion, complementary housing member 60 which may be in the form of a readily machinable plate secured as by means of brazing to a flat face portion 61 on the perimeter of the cap member 15.

Within the housing defined by the housing members 58 and 60 is a valve chamber defined on one side of the parting face by a recess or cavity 62 in the fixedly attached housing member 60 and on the opposite side of the parting face by a matching aligned recess or cavity 63 in the housing member 58. These chamber cavities are separated in fluid tight relation from one another by a flexible diaphragm 64 which may be made from suitable rubber, either natural or synthetic, as preferred, which is marginally clamped between the housing members 58 and 60 and serves as a leak-preventing seal for the parting face. Through this arrangement, the diaphragm 64 isolates the chamber cavity 62 serving as a water flow sub-chamber from the chamber cavity 63 serving as a valve chamber.

Means are provided for effecting communication between the flow passage system within the distributor member 15 and the flow sub-chamber 62 for both backwashing and regeneration circulation and runoff of effluent through a port 65 opening from the sub-chamber 62 through one side of the housing member 60 into a drain conduit 67 leading to a sewer. To this end, a pair of spaced apart, parallel axis stub ducts 68 and 69 project from the base wall of the sub-chamber 62 with their free ends in a common plane short of the parting face plane of the member 60 and opposing the diaphragm 64. Within the sub-chamber 63 a poppet valve 70 opposes the discharge end of the stub duct 68 and a poppet valve 71 opposes the discharge end of the stub duct 69. These poppet valves are preferably identical in construction and each has a stem 72 slidably guidedly extending through a guide bore 73 opening through the housing plate member 58, with the outer end of the stem 72 in each instance projecting a limited distance beyond the outer face of the housing plate member. Through this arrangement, it will be apparent that pressure applied inwardly on the respective stems 72 will thrust the poppet valves 70 and 71 against the diaphragm 64 and thrust the diaphragm portion interposed between the poppet valve and the discharge end of the opposed stub duct into water sealing relation to such stub duct discharge ends.

Normally the discharge ends of the stub ducts are closed by the poppet valves 70 and 71 sealingly thrusting the diaphragm 64 against the discharge ends. In a desirable construction to accomplish this, toggle linkage interlock thrust means are utilized including respective rocker arms 74 having lower end portions pivotally attached to respectively opposite sides of an outwardly projecting vertical supporting ear or fin plate or bracket portion 75 projecting outwardly from the outer face of the housing plate member 58 medially between the guide bearing bores 73, and with the upper end portions of the rocker arms 74 opposing the outer ends of the poppet valve stems 72.

Normally the rocker arms 74 are locked in position wherein respective adjustable set screws 77 are carried by the rocker arms and thrust against the outer ends of the poppet valve stems 72 and thereby thrust the poppet valves 70 and 71 into closing relation to the respective stub ducts 68 and 69, resilient yield ability of the interposed diaphragm 64 affording resilient cushioning and a slight back pressure. This affords sufficient back thrust for maintaining a toggle lever 78 pivotally attached to the upper end portion of the respective rocker arm 74 in straight thrusting alignment with a respective generally U-shaped toggle link yoke 79 having its arms pivotally connected adjacent free ends to the lever link and projecting outwardly and pivotally connected by a pin 80 to the bracket 75. Normally the portion of the lever arm link 78 between the pivotal connection thereto of the toggle link 79 and the pivotal connection to the rocker arm 74 is in substantially straight alignment with the toggle link 79 so that outward thrust on the rocker arm 74 is firmly resisted and the rocker arm thereby held in valve closing position. Any tendency toward jackknifing of the toggle linkage due to back pressure is counteracted by an underslung integral outwardly projecting portion 81 of the lever member 78 engagably underlying the yoke of the associated toggle link member 79 and by having the pivotal connection between the toggle link and the lever slightly above center with respect to the toggle link pivot 80.

During normal service periods a quite positive tensioning of the toggle linkage mechanism against accidental movement to valve opening position is afforded by flexible connection of the outer end portions of the lever projections 81 as by means of chains 82 to an ear 83 of a rockably releasable lever plate 84 (FIGS. 1 and 3) mounted oscillatably on a stub shaft 85 carried by the bracket plate 54 and overlying the toggle linkage assembly. Normally the rocker lever plate 84 is biased as by means of a tension spring 87 into a position wherein the flexible connections 82 pull upwardly on the lever projections 81 and thus positively maintain the levers 78 in the valve closing position.

At predetermined time intervals the safety latch afforded by the rocker lever plate 84 is released and the toggle linkages for the poppet valves are actuated for opening the poppet valves. Rocking of the latch plate 84 in opposition to bias of the spring 87 is effected by engagement against a cam edge 88 on the plate 84 of a trip lug 89 on a trip dog 90 adjustably attached as by means of a securing screw 91 to the margin of the timer dial 52. In the illustrated arrangement, the trip lug 89 engages the tripping cam edge 88 of the plate member 84 once every twenty-four hours and in the continuing rotation of the dial 52 rocks the plate 84 into toggle linkage releasing position as depicted in FIGURES 4 and 5. The length and disposition of the trip cam edge 88 relative to the trip lug 89 is such, as shown, as to maintain tripping engagement throughout the backwashing and regeneration cycles consecutively, whereafter the trip lug 89 leaves the cam edge 88 and the biasing spring 87 snaps the latch plate 84 into the valve closing bias of the toggle linkages.

Because of the self-locking capability of the toggle linkages for the poppet valves, after the latch plate 84 is shifted to non-operating position by the trip lug 89, the poppet valves will remain closed until the respective controlling toggle linkages therefor are tripped. Such tripping of the toggle linkages is also controlled by the rotating timer dial 52 which for this purpose is equipped on its margin with a trip dog 93 adjustably secured in place as by means of a screw 94 and having a trip lug 95 which projects radially relative to the perimeter of the dial 52. At the proper time following tripping of the latch plate 84, the trip dog 95 engages an arm or prong of a star wheel 97 rotatably mounted on the stub shaft 85 and corotatively coupled with a trip wheel 98 coaxially mounted on the stub shaft 85 and facing the bracket plate 54 in spaced relation, with a take-up and friction brake compression spring 99 thrusting between the bracket plate 54 and the trip plate 98.

As the trip dog lug 95 advances toward the star wheel 97 and engages one of the arms of the star wheel, it causes the star wheel slowly to turn counterclockwise whereby similarly to turn the trip wheel 98 and disengage a spring detent 100 mounted on the bracket plate 54 from one of a series of peripheral detent notches 101 in the trip wheel normally retaining the trip wheel against overrunning. Rotation of the trip wheel 98 advances the adjacent one of a marginally mounted spaced series of trip bosses or lugs 103 and 104 toward an upstanding trip arm 105 on the inner end of the link 79 of the toggle linkage for controlling the poppet valve 70 normally closing the stub duct 68 providing a discharge outlet for backwash effluent. As a result, the associated toggle link 79 is swung downwardly and swings the associated toggle lever 78 downwardly whereby the rocker arm 74 is released to swing outwardly and thereby release the poppet valve 70.

Immediately upon opening of the outlet from the stub duct 68, a flushing by-pass is opened through the distributor cap member 15 to the upper end of the bore 33 in the valve body 18 from which the port 34 opens, and also momentarily bleeds off direct line pressure delivered through the lateral passage 32 into the bore 33. This backwash by-pass passageway includes a lateral bore 107 in the cap member 15 leading to the stub duct 68 from an upwardly opening recessed chamber 108 in the top of the distributor cap body 15 into which discharges a short upwardly projecting stub duct 109 leading from a vertical bore 110 of smaller cross-sectional flow area than a downwardly opening counter bore 111 communicating coaxially therewith in the distributor body 15 and coaxially aligned with the upper end of the bore 33 in the valve body 18.

Normally the upper free end of the stub duct 109 is closed by a diaphragm valve including a diaphragm member 112 normally pressed into sealing relation to the end of the stub duct 109 by a poppet valve member 113 biased by means such as a compression spring 114 housed within a closure cap fitting 115 movably secured in place and clamping the diaphragm 112 sealingly into a counter bore recess 117 by means of screws 118 (FIG. 6). Line pressure through the bore 110 forces the diaphragm 112 open against the bias of the spring 114.

Water pressure working upwardly within the bore 111 works against the underside of a flange 119 on the upper end of a stem 120 normally projecting upwardly from a valve member 121 within the bore 33 and as shown in full outline in FIGURE 8 located above the port 34. This lifts the valve 121 and unseats it from a valve seat 122 provided as a flange at the lower end of the bore 33 and the upper end of the bore 43, and opens a port 123 through the valve seat flange to by-pass raw water in the direction depicted by dash arrows to flow through the bore 43, the lateral branch 42, the bore 40, the lateral branch 39, the bore 38 and down through the pipe 37 and the screen 35 under the mineral bed 13 to percolate upwardly through the mineral bed to flush foreign matter therefrom and draw the same off through the side port 34 in the valve body 18 and upwardly through the flushing by-pass passage system to the drain duct 67.

Immediately upon being unseated at the start of the backwashing cycle, the valve 121 by virtue of the cumulative pressure on its underside and on the starting flange 119 moves upwardly and substantially sealingly engages a valve seat 124 provided on the lower end of a tube 125 secured within the bore 111 and extending across the parting face between the cap member 15 and the valve body 18. An opening 127 into the tube 125 registers with the port 34. When the valve 121 is sealingly seated on the valve seat 124 as shown in dash outline in FIG. 8, all of the raw water is diverted through the port 123 in the backwashing direction, although if there is a service demand sufficient raw water to supply the demand can pass on through the branch 44 and the bore 45 to the service duct 21.

Backwashing continues for an appropriate interval of time such as ten or fifteen minutes depending upon the predetermined requirements for the water handled by the system.

By the present invention, it is possible either to backwash selectively alone or backwash and immediately consecutively regenerate. Where it is desired to alternate backwashing alone and after the succeeding backwashing also regenerate, the trip lugs 104 on the trip wheel 98 are selected to be shorter than the trip lugs 103 so that the trip lugs 104 will initiate only a backwashing cycle by tripping of the trip arm 105, whereafter the system can return to service flow. This will occur each time one of the shorter trip lugs 104 is brought into operative toggle arm tripping position by the periodic turning of the trip wheel 98. Of course, if desired, all of the trip lugs may be of the longer length of the lugs 103. On the other hand, certain of the lugs may be skipped altogether as, for example, where it is desired to backwash and regenerate at different longer intervals than every twenty-four hours. It will thus be seen that a variety of settings can be provided for by adjustment in the spacing or the length of the trip lugs mounted on the trip wheel 98.

Assuming that one of the longer trip lugs 103 has tripped the backwash toggle linkage arm 105, after the backwashing time interval, the trip lug 103 in the continued turning of the trip wheel 98 as motivated through the star wheel 97 by the trip lug 95 contacts and trips an upwardly and angled trip arm 127 extending from the inner end of the toggle link 79 of the linkage controlling the poppet valve 71 and interposed in the path of the trip lug 103 a sufficiently offset distance in the direction of travel of the trip lug to retain the poppet valve 71 locked until backwashing has been effected for a predetermined cyclical time. Immediately upon tripping of the trip arm 127, and thereby unlocking of the linkage that controls the poppet valve 71 it opens (FIG. 5) the discharge end of the stub duct 69 which communicates through a branch bore 128 with a downward extension 129 in the cap body 15 aligned with and communicating through a small diameter bore 130 in the valve body 18 leading by way of a branch 131 into the upper end of a bore extension 132 coaxially aligned with the bore 41 and the port 40. This initiates a regeneration cycle and discontinues the backwash flow by closing of the diaphragm valve 112 through the bias of the spring 114 as a result of drop in the pressure through the backwash flow path. At the same time, however, the valve 121 remains in closing position on the valve seat 124 so that service demands can be met without interruption. As the water pressure builds up through the bore 132, it acts upon a pressure sensitive flange 133 normally throttling such flow at the lower end of the bore 132 and carried by the upper end of a valve stem 134 attached to a control valve 135 normally gravitationally seating in an out of the way position on a closure plug 137 of an access opening 138 into the lower end of the bore 41. The valve 135 is thus carried into closing seating relation to a valve seat 138 at the lower end of the port 40. This closes the port 40 against flow of raw water and the pressure of the raw water on the underside of the valve 135, together with the pressure sensitive flange 133 holds the valve seated during the regeneration cycle.

A further result of closing of the valve 135 resides in by-passing of raw water from the top of the blind end bore 29 through a lateral passage 140 into a chamber 141 recessed in the top of the distributor body 15 and closed by a removable plug 142 held in place as by means of a screw 143 (FIG. 6). Leading downwardly from the chamber 141 is a brine aspirator bore 144 having in its upper portion a venturi nozzle 145 issuing toward the adjacent spaced end of a restrictor 147 whereby the pressure drop across the gap between the members 145 and 147 causes brine to be sucked into the aspirator through a port 148 to which the brine intake pipe 22 is connected. From the injector or aspirator, the brine passes into a bore 149 extending longitudinally through the length of the valve body 18 to deliver the brine into the tank 11 above the mineral bed 13 for downflow regeneration of the mineral.

Brine is sucked into the regeneration flow system until a float 150 drops by lowering of the brine level in the tank 24 to close a valve within a housing 151 at the intake end of the brine conduit 23. However, water from the supply line continues to flow through the regeneration flow path and out to the sewer through the drain duct 67 for a suitable rinsing interval predetermined by the trip lug 89 retaining the toggle linkage lock plate 84 in its inactive position. After the timer dial 52 has rotated sufficiently to carry the trip lug 89 beyond the cam edge 88 of the plate 84, the spring 87 snaps the lock plate 84 clockwise to draw the chains 82 taut and pull the levers 78 into rock arm 74 thrusting horizontal position and thereby close the poppet valves 70 and 71. This restores the system to service supply and both of the valves 121 and 135 return to initial position by gravity. That is, the valve 121 leaves the seat 124 and engages the seat 122 and the valve 135 returns to its at rest normal position on the plug 137.

It will be understood that modifications and variations may be effected without departing from the scope of the novel concepts of the present invention.

I claim as my invention:

1. In a water treatment apparatus,
a treatment tank,
a bed of exchange material positioned in the bottom of said treatment tank,
a brine tank,
a conduit for connecting said brine tank and treatment tank,
drain means associated wtih said treatment tank,
a valve structure positioned within the upper portion of said treatment tank and having said conduit and drain means connected therewith and arranged to control the flow of water and brine through the tank,
said valve structure including a first chamber and a second chamber adjoining and communicating with one another,
a valve seat at the junction of said chambers,
a first passage in said valve structure in communication with said first chamber and with the interior of said tank above said bed,
a second valve seat formed at the junction of said passage and said first chamber,
a first valve member movable in said first chamber between said valve seats,
a fluid pressure responsive area on said first valve member for moving it selectively between said seats,
said valve structure further including
    an inlet port communicating with said first chamber between said seats and arranged to be connected to a source of untreated water,
    and an outlet port communicating with said second chamber and adapted to be connected to a treated water system,
passage means connecting said outlet port with the interior of said treatment tank below said bed,
a second conduit connecting the drain means with said passage means and having means for selectively controlling drainage from the tank,
means for closing said passage means to stop the flow of water therethrough when said treatment tank is being drained and including a valve seat intermediately therein and a second valve member separately operable from said first valve member and having a valve stem extending therefrom through said intermediate valve seat and into said second conduit,
said valve stem having drainage-flow responsive means thereon to move the valve stem and thereby said second valve member onto said intermediate valve seat,
and an ejector mounted on said valve structure and having a delivery passage in communication with the interior of the treatment tank above said bed and with said brine tank conduit and said inlet port and being operable during draining of the treatment tank and closing of said passage means by said second valve member to draw brine into said treatment tank to circulate through the bed of exchange material.

2. Water treatment apparatus as defined in claim 1, including a drainage passage having communication with said first passage and said first valve member being exposed to pressure differential in said first passage resulting from drainage flow through said drainage passage so that said fluid pressure responsive area on the first valve member responds to move the first valve member.

3. In a water treatment apparatus,
a treatment tank,
a brine tank,
a first conduit leading from said brine tank to said treatment tank,
drain means associated with said treatment tank,
a valve structure positioned within said treatment tank for controlling the flow of water and brine through said treatment tank,
said valve structure including:
    an inlet port having means for connection to a source of untreated water,
    and an outlet port having means for connection to a treated water system,
said valve structure further including first passage means connecting said inlet port with said treatment tank and with said outlet port and a first valve element movable in one direction responsive to water flow through said first passage means to close this passage means from the treatment tank and movable in the opposite direction by gravity to close this passage means from the outlet port.
second passage means in said valve structure connecting the interior of said treatment tank and said outlet port,
a second and separately operable valve element movable to a first position by water flow and movable to a second position by gravity and operable in said first position to close said second passage means,
a second conduit connecting said second passage means and said drain means,
said second valve element having means responsive to water flowing through said second conduit to move said second valve element to said first position,
and an ejector mounted on said valve structure communicating with said inlet port and with said treatment tank and operable when said second valve element is in said first position to draw brine through said first conduit and deliver the brine into said treatment tank.

4. Water treatment apparatus as defined in claim 3 further characterized by,
said second valve element being positioned in said second passage means and including a valve stem extending into said second conduit,
flow responsive means on said valve stem,
said flow responsive means being effective during drainage through said second conduit to move said second valve element into said first position.

5. Water treatment apparatus as defined in claim 3 wherein said valve structure comprises a unitary body having adjacent vertical bores one of which comprises at least part of said first passage means and in which said first valve element is operable and comprising vertically spaced valve seats on the lower of which the first valve element engages in its gravity-moved position and the upper of which the first valve element engages in the water flow responsive position thereof, the other of said bores having a valve seat vertically spaced above the second position of the second valve element and engageable by the second valve element in said first position thereof.

6. In a water treating apparatus including regenerant supply means and a water tank having a water treating mineral bed therein and including a top having an access opening thereinto,
a water flow controlling unit comprising
    a distributor cap structure having means for securing it in closing relation to said access opening on said tank top,
and a valve body carried by said cap structure and projecting downwardly into the tank,
said distributor cap structure and valve body having intercommunicating respective flow passages therein,
flow-responsive control valves in the passages in said valve body,
controlling valves carried by said distributor cap structure in control of the passages therein and through such control controlling operation of said flow-responsive control valves,
respective valve-controlling plungers extending horizontally from said controlling valves and projecting outwardly from the cap structure,
respective toggle linkages mounted on the cap structure in alignment with said plungers and having an interlocking relation in which the valve-controlling plungers are thrust inwardly to close said controlling valves,
regenerant supply conduit means leading from said supply means into said cap structure and communicating with certain passages therein,
water intake conduit means and water service delivery conduit means connected to said cap structure and communicating with said flow passages therein,
and timer mechanism wholly mounted on and carried in unitary assembly with said cap structure operatively adjacent to said toggle linkages and having means operating cyclically to release said toggle linkages from said plunger-thrusting interlocking relation whereby to open said distributor valves and after reset timed intervals automatically returning the toggle linkages to the valve plunger-thrusting interlocking relation.

7. In a water softening apparatus,
a treatment tank having an upward access opening.
a bed of exchange material positioned in the bottom of the treatment tank,
a brine tank,
a conduit for connecting the brine tank with the treatment tank,
a drain-off conduit for connection with the treatment tank,
a valve structure including a vertically elongated valve body extending into the upper portion of the tank through said opening,
a distributor body attached to the top of the valve body and extending upwardly from the top of the tank,
means on said valve structure removably securing the valve structure to the tank in closing relation to said opening,
said valve body having flow passage means therein communicating with the interior top portion of the tank and also having means effecting communication of said passage means with the area in the tank under said bed of exchange material,
flow-responsive valves for automatically controlling said passage means in the valve body,
said distributor body having flow passages therein operatively communicating with the flow passage means in the valve body,
said distributor body having a first port for conducting raw water from a supply pipe to the distributor body passages,
said distributor body having a second port leading from said passages for delivery of soft water from the distributor body to a service line,
an aspirator in the distributor body communicating with the brine tank conduit and having communication with the treatment tank above said bed,
means communicating with the flow passages in the distributor body for directing water under pressure through the aspirator to effect supply of brine to the treatment tank, a plurality of drain outlets in the distributor body communicating with the distributor body flow passages, respective poppet valves carried by the distributor body and operative to control said drain outlets to open in predetermined sequence in backwashing and regeneration and rinsing cycles and including means normally responsive to water pressure in said distributor body passages to open the poppet valves, toggle linkage means mounted on said distributor body and operatively related to said poppet valves, means functioning to set said toggle linkage means to close both of said poppet valves during normal delivery of soft water from the distributor body through said second port, and a timer assembly mounted on and in unitary assembly with said distributor body and having cyclically operable trip means operative to disable said setting means and to unlock said toggle linkage means in cyclical sequence to release said poppet valves to open said drain outlets.

8. A water treatment apparatus as defined in claim 7, in which said toggle linkage means include bracket structure carried by said distributor body and respective sets of toggle levers operatively supported by said bracket structure in alignment with said poppet valves, said poppet valves including reciprocable plungers aligned with respective sets of said toggle levers, said setting means comprising biasing means connected to the sets of levers and normally maintaining the levers in an interlocking relationship thrusting the plungers into poppet valve closing relation, respective trip arm means on the toggle levers, said timer having cycling mechanism including means to disable said biasing means and release said levers therefrom during a predetermined portion of a cycle of operation of the timer, and means operative after disabling of the biasing means in each such cycle to engage and trip said trip arm means in predetermined sequence to unlock the toggle levers for opening of said poppet valves.

9. In a water treating apparatus including regenerant supply means and a water tank having a water treating mineral bed therein and including a top having an access opening thereinto, a water flow controlling unit having means for securing it in closing relation to said access opening and including a distributor cap structure projecting above said top and a valve body carried by said cap structure and projecting downwardly into the tank, said valve body having flow passage means therein communicating with the upper interior portion of the tank and also having means effecting communication of said passage means with the bottom of said mineral bed, automatically flow-responsive valves in said valve body for controlling said passage means, said distributor cap structure having passages therein communicating operatively with said flow passage means, said distributor cap structure having respective ports connecting said passages with raw water supplying and treated water system conduits, regenerant introducing means in said distributor cap connected with said regenerant supply means and communicating with said tank above said mineral bed, drain outlet means on said distributor cap including a pair of discharge ports communicating with said passages and a pair of reciprocal plunger valve members mounted in horizontal position on said distributor cap and on spaced parallel axes and respectively controlling said discharge ports, a bracket mounted on said cap between said members, respective toggle lever assemblies operatively aligned with said members and each mounted on said bracket for movement between an interlocked condition in which the associated member is held in position to close the discharge port controlled thereby and each of the toggle lever assemblies being movable to an unlocked condition in which the associated member is released for opening of the respective discharge port controlled thereby, each of said lever assemblies having an upwardly extending trip arm, means normally biasing each of the lever assemblies into the interlocked condition, and timer mechanism mounted on said distributor cap in an operative position above said toggle lever assemblies and having cyclically operable means functioning in each cycle to release said biasing means from the toggle lever assemblies and then to trip said arms and after a predetermined time interval to permit said biasing means again to operate to interlock said toggle lever assemblies, whereby in each cycle of operation of the timer said passage means in the valve body and said flow responsive valves in said passages in the distributor cap are controlled successively to function in a service cycle followed by a backwash cycle which in turn is followed by a regeneration cycle succeeded by a rinsing cycle and then return to a service cycle.

References Cited by the Examiner

UNITED STATES PATENTS

| | | | |
|---|---|---|---|
| 1,866,890 | 7/1932 | Horvath | 210—190 X |
| 2,240,277 | 4/1941 | Zoder | 137—590 X |
| 2,999,514 | 9/1961 | Kryzer | 210—191 X |
| 3,006,376 | 10/1961 | Schulze et al. | 210—191 X |
| 3,019,817 | 2/1962 | Whitlock | 137—624.18 |
| 3,049,237 | 8/1962 | Whitlock et al. | 210—191 X |
| 3,049,238 | 8/1962 | Whitlock | 210—191 |
| 3,053,268 | 9/1962 | Schulze et al. | 210—191 X |
| 3,073,341 | 1/1963 | Schernekau | 210—191 X |
| 3,083,728 | 4/1963 | Schulze et al. | 210—191 X |
| 3,109,453 | 11/1963 | Lincoln | 137—590 |

REUBEN FRIEDMAN, *Primary Examiner.*

GEORGE D. MITCHELL, HERBERT L. MARTIN,
*Examiners.*